(12) United States Patent
Park et al.

(10) Patent No.: US 7,876,982 B2
(45) Date of Patent: Jan. 25, 2011

(54) SURFACE TEMPERATURE SENSING SYSTEM

(75) Inventors: Brian Park, Austin, TX (US);
Mohammed Fassih-Nia, Austin, TX (US)

(73) Assignee: SensorTran, Inc., Austin, TX (US)

( * ) Notice: Subject to any disclaimer, the term of this patent is extended or adjusted under 35 U.S.C. 154(b) by 464 days.

(21) Appl. No.: 11/937,703

(22) Filed: Nov. 9, 2007

(65) Prior Publication Data

US 2009/0123110 A1    May 14, 2009

(51) Int. Cl.
*G02B 6/00* (2006.01)
(52) U.S. Cl. ............................. 385/12; 385/53; 385/88; 385/92; 385/94
(58) Field of Classification Search ................... 385/12, 385/53, 88, 92, 94
See application file for complete search history.

(56) References Cited

U.S. PATENT DOCUMENTS 4,631,956 A * 12/1986 Walden et al. ........... 73/170.29
6,891,621 B2 * 5/2005 Berg et al. .................. 356/477
7,251,384 B2 * 7/2007 da Silva Junior et al. ...... 385/13
7,280,220 B2 * 10/2007 Kinugasa et al. ............ 356/479
7,509,008 B2 * 3/2009 Perales et al. ............... 385/100

OTHER PUBLICATIONS

"Spinoff 2006: Innovative Partnerships Program" by the National Aeronautics and Space Administration Center for AeroSpace Information (CASI) pp. 94-97, 2006.

* cited by examiner

*Primary Examiner*—Jennifer Doan
(74) *Attorney, Agent, or Firm*—Michael A. Ervin; M.A. Ervin & Associates

(57) ABSTRACT

A sensor apparatus for sensing parameters of an object may include at least one optical fiber, one or more attaching members and a tensioner. The one or more attaching members may be coupled to the optical fiber and may attach the one optical fiber to an object. The tensioner may be coupled to the optical fiber and may secure the one or more optical fiber against a surface of an object.

5 Claims, 8 Drawing Sheets

US 7,876,982 B2

SURFACE TEMPERATURE SENSING SYSTEM

BACKGROUND OF THE INVENTION

1. Field of the Invention

The present invention relates generally to temperature sensing and, more particularly, to an apparatus and system for sensing a temperature of a surface of an object.

2. Description of Related Art

Certain objects, such as chemical reaction vessels, require careful temperature sensing over one or more of the surfaces of the object. For example, in a chemical reaction vessel, certain portions of the surface may reach hazardously high temperatures when certain reactions take place within the reaction vessel. If the hazard is not identified, and the reaction is not controlled, a catastrophic breach of the vessel may occur. Furthermore, the exact surface or location on the surface where hot spots occur may be unpredictable.

One method of monitoring surface temperatures is distributed temperature sensing using optoelectronic devices attached to fiber optic cables. In typical distributed temperature sensing systems, the fiber optic is wrapped around an object, such as a reaction vessel, in a single continuous helical coil. For example, the temperature sensor described in U.S. Pat. No. 5,821,861 to Hartog, et al. describes a fiber optic temperature sensor wrapped around a reactor vessel in a continuous helical coil. A continuous helical coil is not ideal because it may be difficult to install and secure a helical coil to a large or complex surface.

The typical distributed temperature sensing system uses thermally conductive cement to affix the fiber optic cable to the surface of the object. Unfortunately, the surface of the object and the thermally conductive cement or fiber optic cable may experience differential thermal expansion. Specifically, the surface of the object may expand more rapidly, or less rapidly than the cement or fiber optic cable. In such situations, the differential thermal expansion may cause the thermally conductive cement to sheer from the surface of the object. This sheering effect may reduce thermal coupling between the surface of the object and the fiber optic cable. In typical situations, the fiber optic cable may become dislodged from its proper position, making temperature readings unreliable and reducing overall system performance.

Published U.S. Patent Application No. 2006/0115204 to Marsh et al. also describes a common distributed temperature system. However, Marsh only describes a small improvement on a typical system. The improvement involves the use of reference coils at certain predetermined locations on the fiber optic cable. The reference coils described in Marsh provide an optoelectronic reference point on the cable for applications where the length of the fiber optic sensor cable actually measuring the temperature of an object of interest is small with reference to the overall length of the fiber optic cable. The reference coils do not physically separate the coil, but provide optoelectronic reference points to electronically isolate a portion of interest from an entire fiber optic cable. This improvement on prior systems does not address the problem of sheering thermally conductive cement caused by differential thermal expansion, or the difficulties involved with helical wrapping of objects.

SUMMARY OF THE INVENTION

In one embodiment, a sensor apparatus is provided. The sensor apparatus may include at least one optical fiber, one or more attaching members and a tensioner. The one or more attaching members may be coupled to the optical fiber and may attach the one optical fiber to an object. The tensioner may be coupled to the optical fiber and may secure the one or more optical fiber against a surface of an object.

In other embodiments, a fiber optic temperature sensor system is provided. The system may include one or more sensor segments configured to sense a distribution of temperature across the surface of an object covered by the one or more sensor segments. In some embodiments, each of the plurality of sensor segments may include an optical fiber and a tensioner coupled to the optical fiber for securing the sensor segment against the object.

In alternative embodiments, a method of fabricating a sensor segment is provided. The method may include positioning at least one optical fiber across a surface of a form, where the form may have dimensions that are substantially equal to a section of an object, affixing a plurality of attaching members to the at least one optical fiber, and affixing a plurality of optical fiber couplers to the at least one optical fiber.

Other features and associated advantages will become apparent with reference to the following detailed description of specific embodiments in connection with the accompanying drawings.

BRIEF DESCRIPTION OF THE SEVERAL VIEWS OF THE DRAWING

The following drawings form part of the present specification and are included to further demonstrate certain aspects of the present invention. The invention may be better understood by reference to one or more of these drawings in combination with the detailed description of specific embodiments presented herein.

DETAILED DESCRIPTION OF THE INVENTION

Preferred embodiments and their advantages are best understood by reference to FIGS. 1 through 9, wherein like numbers are used to indicate like and corresponding parts.

The present disclosure provides systems and methods for sensing parameters such as temperature from a surface of an object. In one embodiment, one or more sensor segments comprising of optical fibers may be placed in direct contact with surfaces of the object. In some embodiments, the one or more sensor segments may be "wrapped" around the surface of the object. Using a distributed temperature sensing (DTS)

system or other parameter sensing systems coupled to the sensor segments, parameters of the surface may be detected and the object as a whole may be monitored in near or real time.

The term "in contact with" as used and define in this disclosure, refers to a sufficient physical relativity of contact or sufficient proximity to a surface of an object such that the sensor segments can effectively be used to determine parameters (e.g., temperatures or other physical properties or characteristics) of the surface of the object or the interior of the object.

Figure 1:
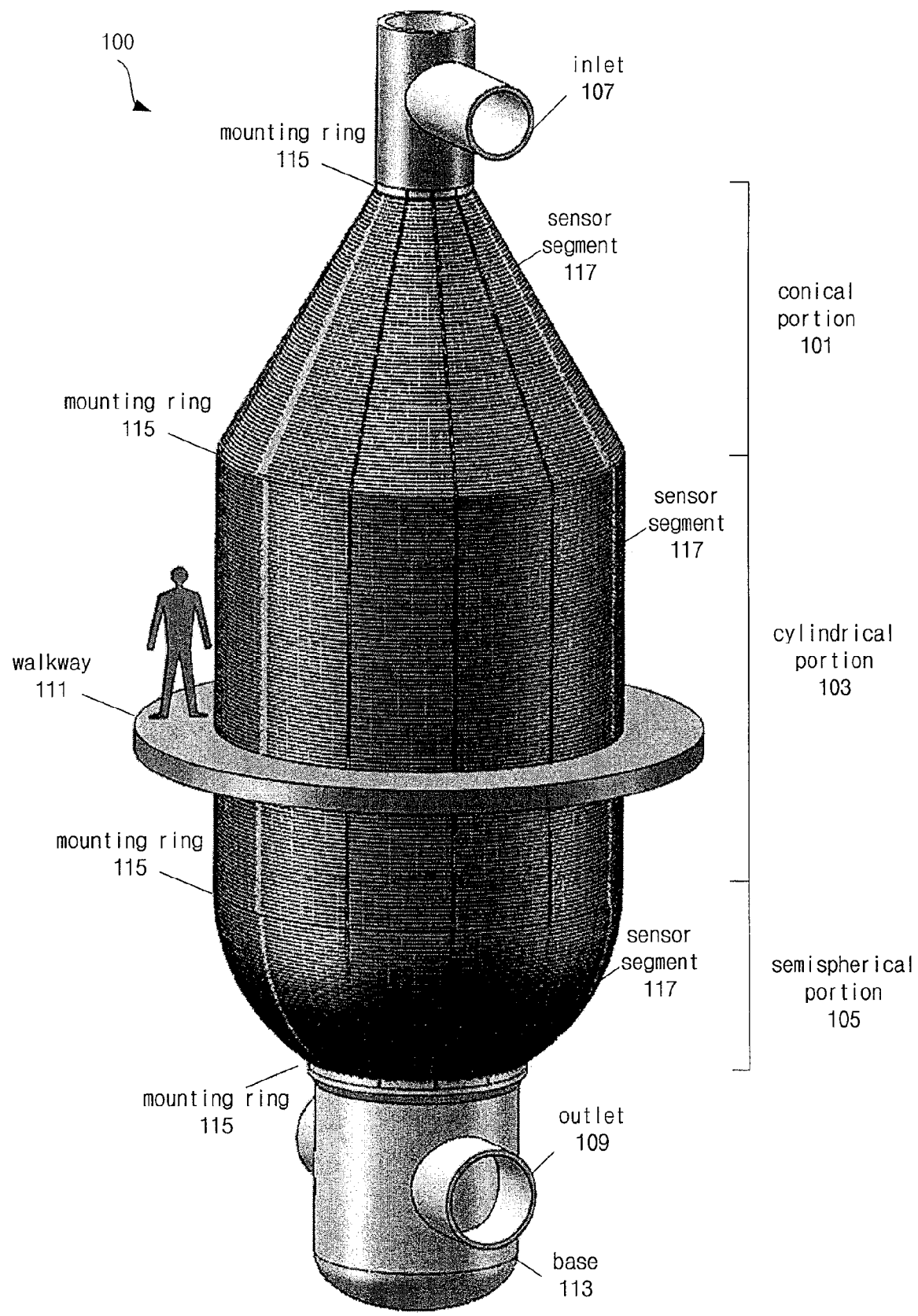
FIG. 1 is a front view diagram illustrating an object and a plurality of sensor segments, in accordance with embodiments of the present disclosure.

FIG. 1 illustrates an example of an object 100 such as a chemical reaction vessel that requires parameters such as temperature to be monitored, in accordance with embodiments of the present disclosure. Object 100 may be of a single geometrical shape (e.g., a cylinder, a cone, a sphere, a hemisphere, a toroid, a cube, a prism, a pyramid, etc.). In other embodiments, object 100 may include or more complex geometrical surfaces. For example, object 100 may include a conical portion 101, a cylindrical portion 103, and a semispherical portion 105. Object 100 may also include a substantially planar surface and/or other geometrical shaped surfaces.

Object 100 may include additional components including, for example, an inlet 107 for receiving material(s) that may be stored in object 100, an outlet 109 for dispensing some or all of the material(s) from object 100. For some objects, a walkway 111 may be provided to access portions of object 100, including one or more protrusions (e.g., manholes, vents, pipes, etc.) on object 100, and in particular, protrusions located at portions 101, 103, and/or 105.

Object 100 may also include a base 113 for securing object 100 in position (e.g., securing the object to the ground, in a test field, in an array comprising one or more objects 100, etc.). Base 113 may be made of any suitable material that may hold the weight of object 100 and the material(s) stored in object 100.

Object 100 may also include one or more sensor segments 117 that may be in contact with the exterior or outside surfaces of object 100. Sensor segments 117 may include a plurality of optical fibers that may be used to detect one or parameter(s) of object 100, such as the temperature of the surface of object 100. Sensor segments 117 are described in more detail with respect to FIGS. 2 through 4.

A plurality of mounting rings 115 coupled to the surface of object 100 may be used to secure one or more sensor segments 117 directly to object 100. Mounting rings 115 may include a coupler (not shown) for securing a strap of sensor segments 117 to object 100 such that the optical fibers of sensor segments 117 may be in contact with the surface of object 100.

In one embodiment, mounting rings 115 may be located between the one or more complex surfaces of object 100, although mounting rings 115 may be located elsewhere on object 100 depending at least on the geometrical shape and/or portions of object 100. For example, mounting ring 115 may be placed between different portions of object 100 (e.g., between conical portion 101 and cylindrical portion 103 and/or between cylindrical portion 103 and semispherical portion 105). In an alternative embodiment, mounting ring 115 may be mounted at either or both distal ends of object 100.

Figure 2:
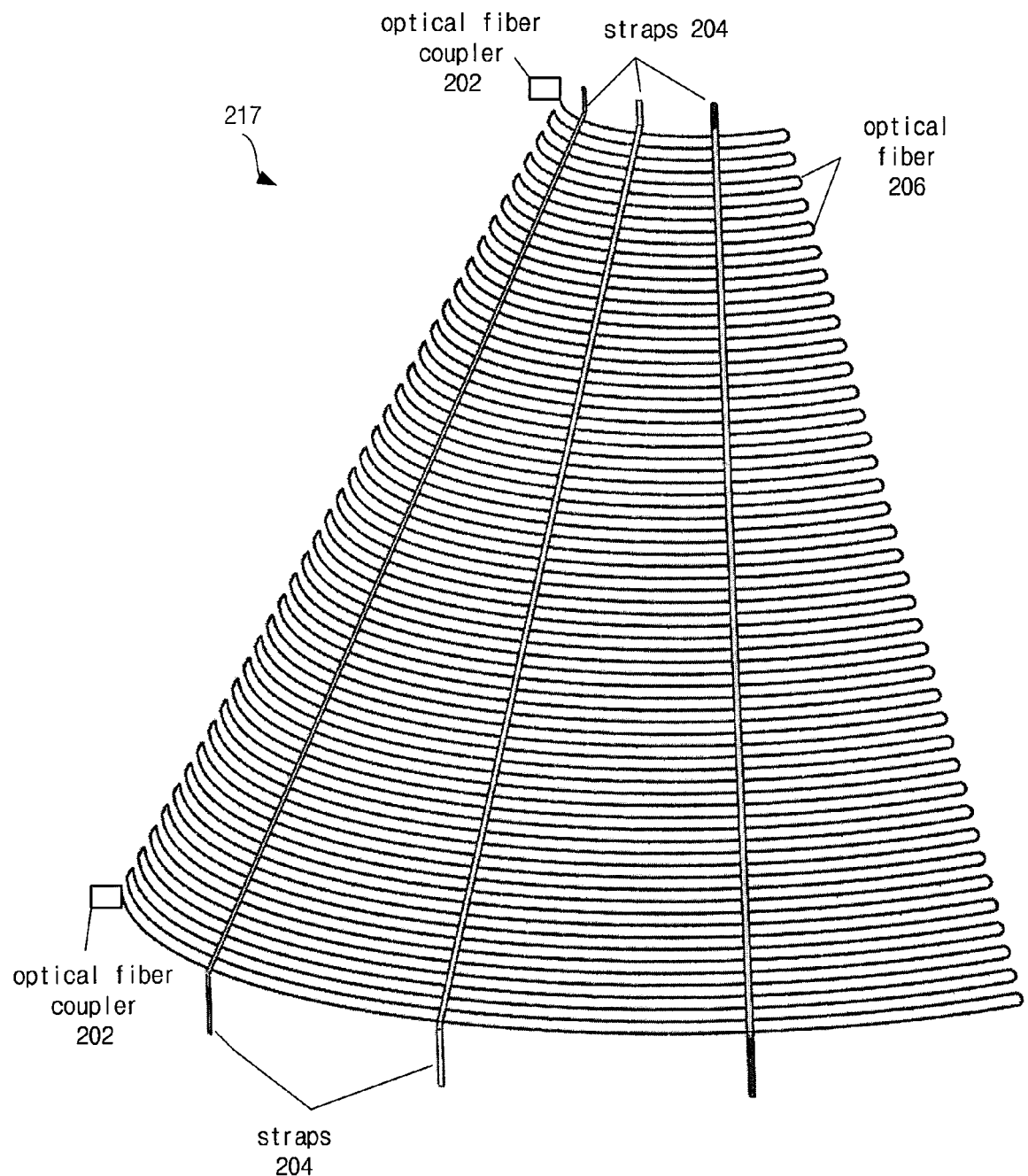
FIG. 2 illustrates a conical sensor segment, in accordance with embodiments of the present disclosure.
Figure 3:
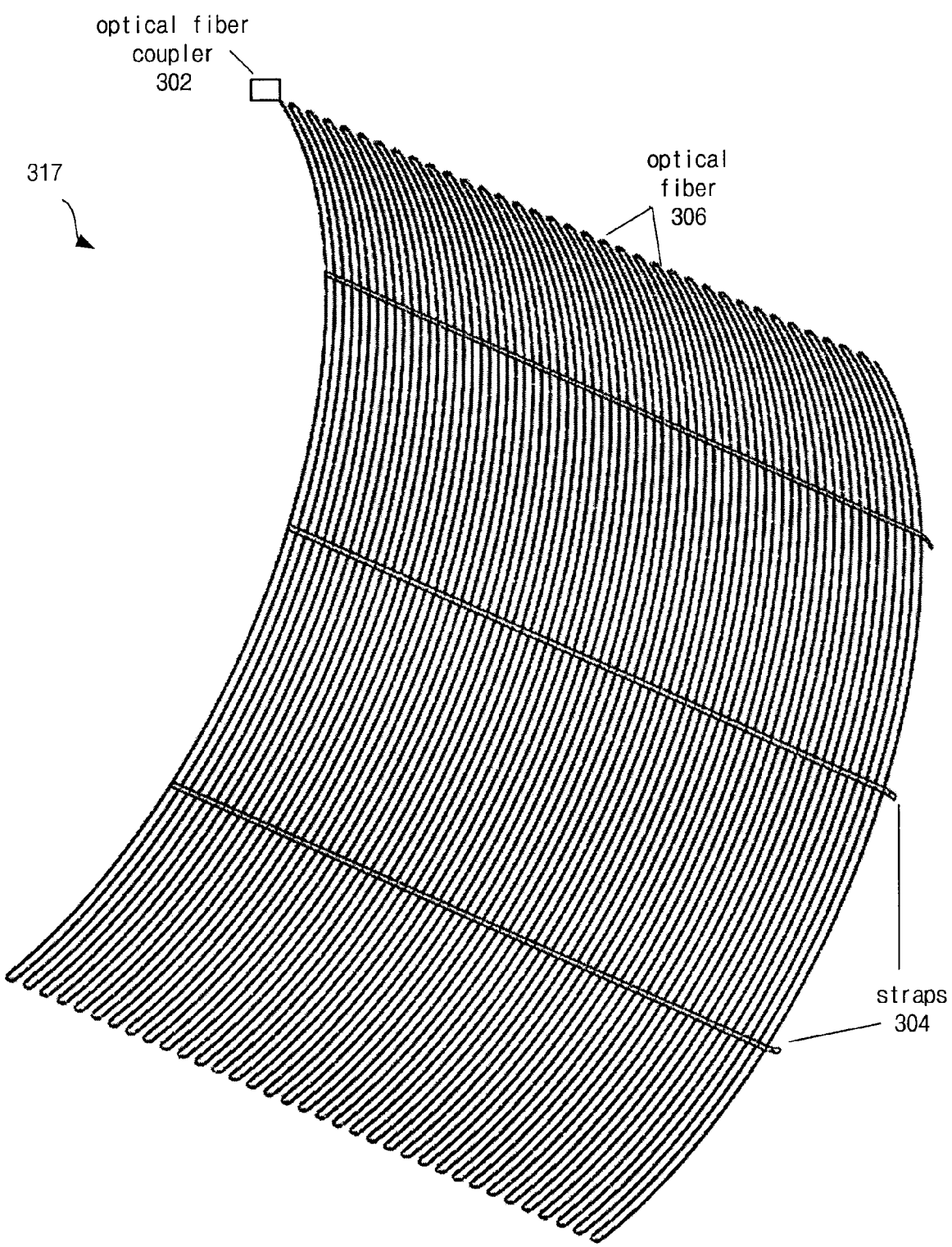
FIG. 3 illustrates a cylindrical sensor segment, in accordance with embodiments of the present disclosure.
Figure 4:
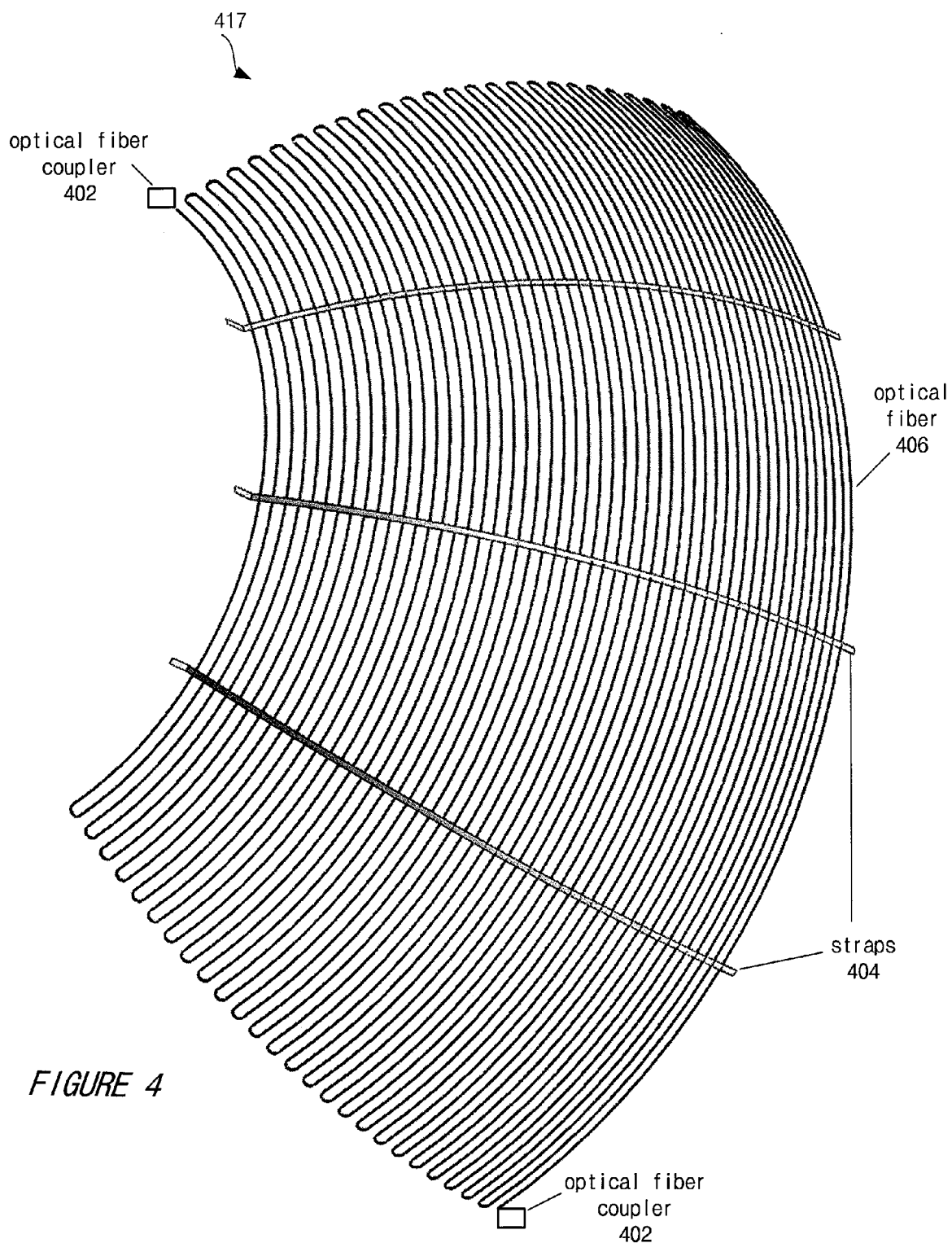
FIG. 4 illustrates a semispherical sensor segment, in accordance with embodiments of the present disclosure.

FIGS. 2 through 4 illustrate examples of sensor segments, in accordance with embodiments of the present disclosure. The sensor segments may be customized according to the shape of object 100. For example, if object 100 is conical in shape, the sensor segment of FIG. 2 may be used and placed in direct contact with the exterior surface of object 100. If object 100 is cylindrical in shape, the sensor segment of FIG. 3 may be used and placed in direct contact with object 100. Similarly, if object 100 is semispherical in shape, the sensor segment of FIG. 4 may be placed in direct contact with object 100.

In some embodiments, if object 100 includes one or more complex geometrical surfaces, a plurality of sensor segments configured for specific portions of object 100 may be used. For example, if object 100 has both a conical and cylindrical shape, the sensor segment of FIG. 2 and the sensor segments of FIG. 3 may both be used and may both be placed in direct contact with object 100.

FIG. 2 illustrates an example conical sensor segment 217, in accordance with embodiments of the present disclosure. Sensor segment 217 may include one or more optical fiber couplers 202, straps 204, and one or more optical fibers 206. Optical fiber couplers 202 may include a male connector or female connector. Alternatively, the coupler 202 may include an optical fiber connection barrel or bullet. Various other embodiments of optical fiber couplers 202 or coupling techniques may be used with the sensor segment 217.

Optical fiber couplers 202 coupled to one or more ends of optical fiber 206 and/or at any portion of optical fiber 206 may be configured to couple with another sensor segment 217, where multiple sensor segments 217 may be coupled in series. For example, one or more sensor segments 217 may be needed to cover the surface of object 100. Multiple conical sensor segments 217 customized for object 100 may be linked together (e.g., welded together or any other techniques used for securing the optical fiber couples together) in series via optical fiber couplers 202. In other embodiments, sensor segment 217 may be wrapped around substantially the entire conical portion 101 of object 100.

Straps 204 may attach conical sensor segment 217 to, for example, a surface of object 100. For example, straps 204 may attach to one or more mounting rings 115 of FIG. 1 with a fastener such as a clamp, bolt, or a hook. In particular, straps 204 may fasten to mounting rings 115 coupled to conical portion 101 of object 100, where straps 204 may provide vertical support to sensor segment 217 such that the sensor segment 217 is in direct contact with object 100.

Optical fiber 206 may be fixed to straps 204. Optical fiber 206 may be any material (e.g., glass, plastic, etc.) that may guide light along the length of the fiber and may be used as a sensor to measure certain parameters including, but not limited to, the temperature of object 100. Optical fiber 206 may include a cladding surrounding a core that may have a refractive index capable of propagating light. The cladding with a refractive index less than that of core may be used to maintain a total internal reflection of the propagating light, thus allowing light to traverse the entire length of optical fiber 206 without any significant loss.

Optical fiber 206 may be positioned in a zigzag or s-shape having different dimensional lengths and radii that form a wedge or trapezoidal shape having a narrow end and a wide end which can conform to conical portion 101 of object 100. In an alternative embodiment optical fiber 206 may be arranged vertically in a zigzag or s-shape with respect to a central axis of an object 100.

FIG. 3 illustrates an example cylindrical sensor segment 317, in accordance with embodiments of the present disclosure. Cylindrical sensor segment 317 may be configured to wrap around, for example, a section or all of cylindrical portion 103 of object 101. Sensor segment 317 may include one or more optical fiber couplers 302, straps 304, and one or more optical fibers 306.

Optical fiber couplers 302 may include a male connector or female connector. Alternatively, the coupler 302 may include an optical fiber connection barrel or bullet. Various other embodiments of optical fiber couplers 302 or coupling techniques may be used with the sensor segment 317. Optical fiber couplers 302 may be coupled to one or more ends of optical fiber 306 and/or at any portion of optical fiber 306 may be configured to couple sensor segment 317 in series with at least another sensor segment 317.

Straps 304 may attach cylindrical sensor segment 317 to, for example, a surface of object 100. For example, straps 304 may be coupled to one or more mounting rings 115 of FIG. 1 with a fastener such as a clamp, bolt, or a hook. In particular, straps 304 may fasten to mounting rings 115 coupled to cylindrical portion 103 of object 100, where straps 304 may provide vertical support to sensor segment 317 such that the sensor segment 317 is in contact with the external surface of object 100.

Optical fiber 306 may be fixed to straps 304 and may be positioned in a zigzag or s-shape that forms a rectangular or square shape which can conform to cylindrical portion 103 of object 100. In an alternative embodiment optical fiber 306 may be arranged vertically in a zigzag or s-shape with respect to a central axis of an object 100.

FIG. 4 illustrates an example semispherical sensor segment 417, in accordance with embodiments of the present disclosure. Sensor segment 417 may be configured to wrap around, for example, a section or all of semispherical portion 105 of object 101. Sensor segment 417 may include one or more optical fiber couplers 402, straps 404, and one or more optical fibers 406.

Optical fiber couplers 402 may include a male connector or female connector. Alternatively, the coupler 402 may include an optical fiber connection barrel or bullet. Various other embodiments of optical fiber couplers 402 or coupling techniques may be used with the sensor segment 417. Optical fiber couplers 402 may be coupled to one or more ends of optical fiber 406 and/or at any portion of optical fiber 406 may be configured to couple sensor segment 417 in series with at least another sensor segment 417.

Straps 404 may attach sensor segment 417 to, for example, a surface of object 100. For example, straps 404 may be coupled to one or more mounting rings 115 of FIG. 1 with a fastener such as a clamp, bolt, or a hook. In particular, straps 404 may fasten to mounting rings 115 coupled to semispherical portion 105 of object 100, where straps 404 may provide vertical support to sensor segment 417 such that the sensor segment 417 is in direct contact with object 100.

Optical fiber 406 may be fixed to straps 404 and may be positioned in a zigzag or s-shape that forms a shape that can conform to semispherical portion 105 of object 100. In an alternative embodiment optical fiber 306 may be arranged vertically in a zigzag or s-shape with respect to a central axis of an object 100.

Figure 5A:
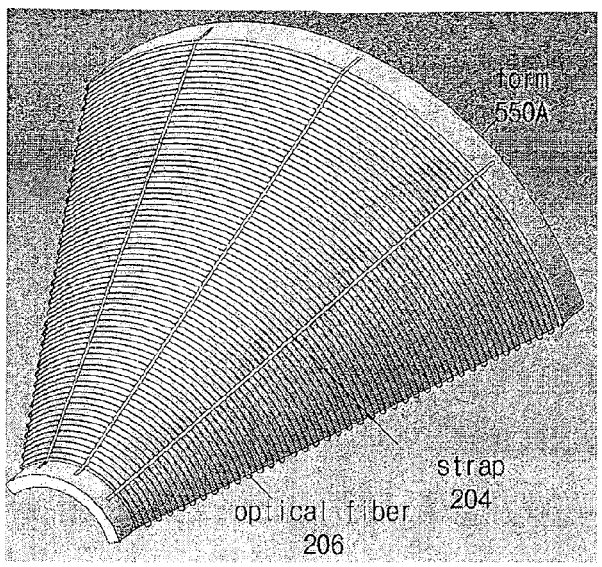
FIGS. 5A through 5C illustrate a form for producing the sensor segments of FIGS. 2, 3, and 4 respectively, in accordance with embodiments of the present disclosure.
Figure 5B:
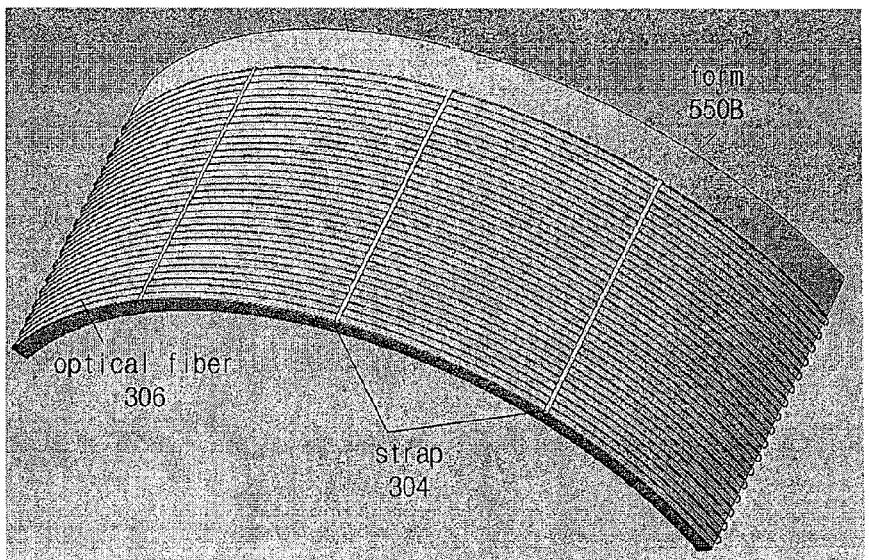
Figure 5C:
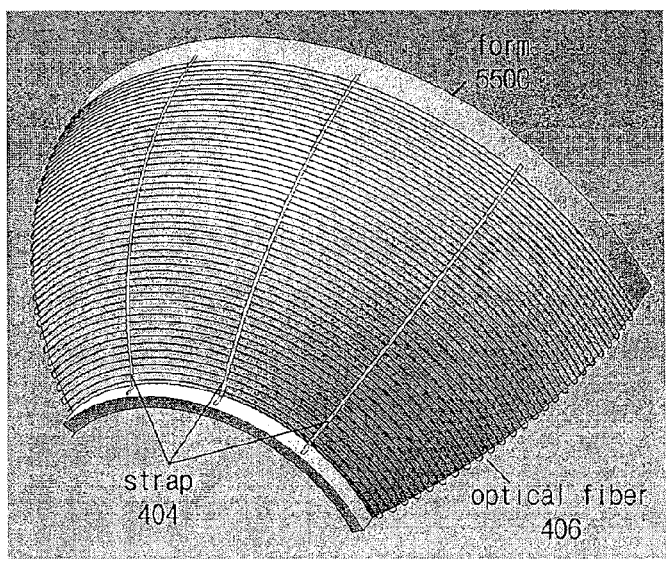

Sensor segments 217, 317, and 417 may be constructed using a form. The form may be an exact size model of a section of an object or the entire object itself. The form allows for customized sensor segment that would conform to the shape of the object. Referring to FIGS. 5A through 5C, illustrates example forms of a section of portions 101, 103, and 105 of object 100, in accordance with embodiments of the present disclosure. Forms 550A, 550B, and 550C may be made of wood, a plastic, or other materials having the same or substantially the same dimensions as a section of portions 101, 103, and 105 of object 100, respectively.

Figure 6:
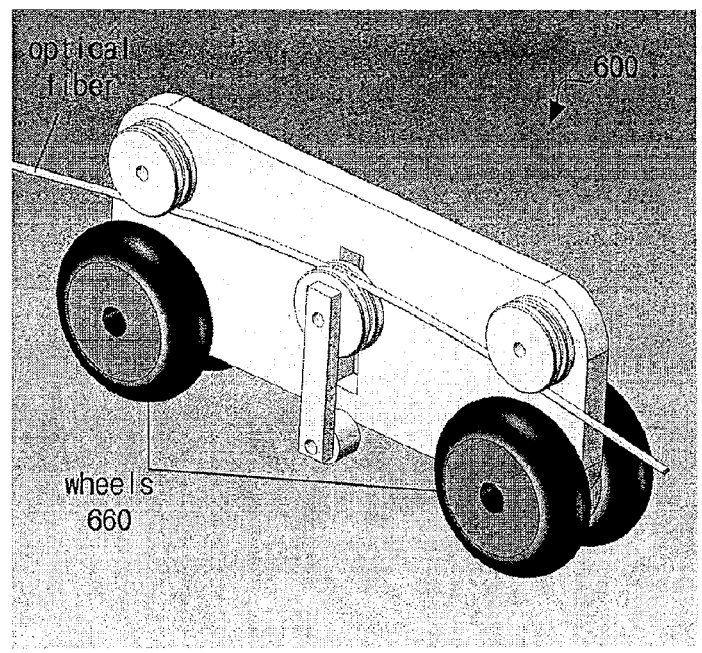
FIG. 6 illustrates a wire bender, in accordance with embodiments of the present disclosure.

In FIG. 5A, optical fiber 206 may be placed in a zigzag or s-shape configuration across form 550A using, for example, a wire bender 600 as shown in FIG. 6. Wire bender 600 may include a set of wheels 660 that may follow the contours of form 550A and may bend optical fiber 206 such that optical fiber 206 may conform with form 550A, and subsequently conical portion 101 of object 101. Similarly, in FIGS. 5B and 5C, optical fiber 306 and 406 may be placed in a zigzag or s-shape configuration across the surface of form 550B and 550C respectively using, for example, wire bender 600.

The corresponding straps may be coupled to the optical fibers laid out on the form and one or more optical fiber coupler may be place at the end portion of the optical fiber or at various locations (e.g., at a bend in the optical fiber).

Upon securing straps 204, 304, and/or 404 to mounting rings 115 of object 100, the one or more sensor segments may be in contact with the exterior surface of object 100. In some embodiments, the one or more sensor segments may require a force that would allow the one or more segments to be directly touching the surface of object 100 while maintaining the ability to expand if object 100 undergoes certain pressures or temperatures that increases the surface area of object 100. The present disclosure provides an apparatus and method for conforming sensor segments 217, 317, and/or 417 to surfaces of object 100, as discussed in more detail with respect to FIG. 7.

Figure 7:
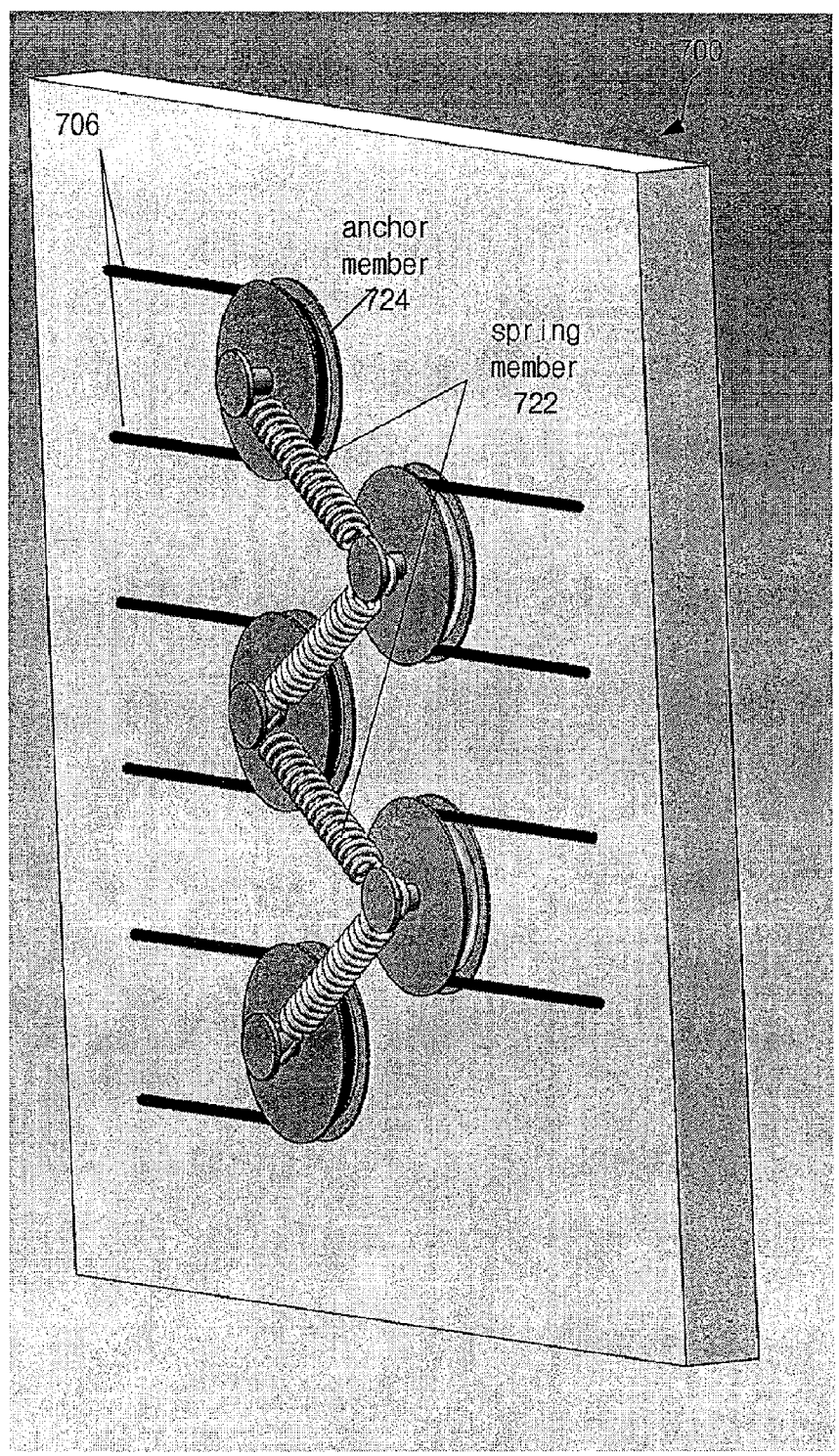
FIG. 7 illustrates a tensioner, in accordance with embodiments of the present disclosure.
Figure 9:
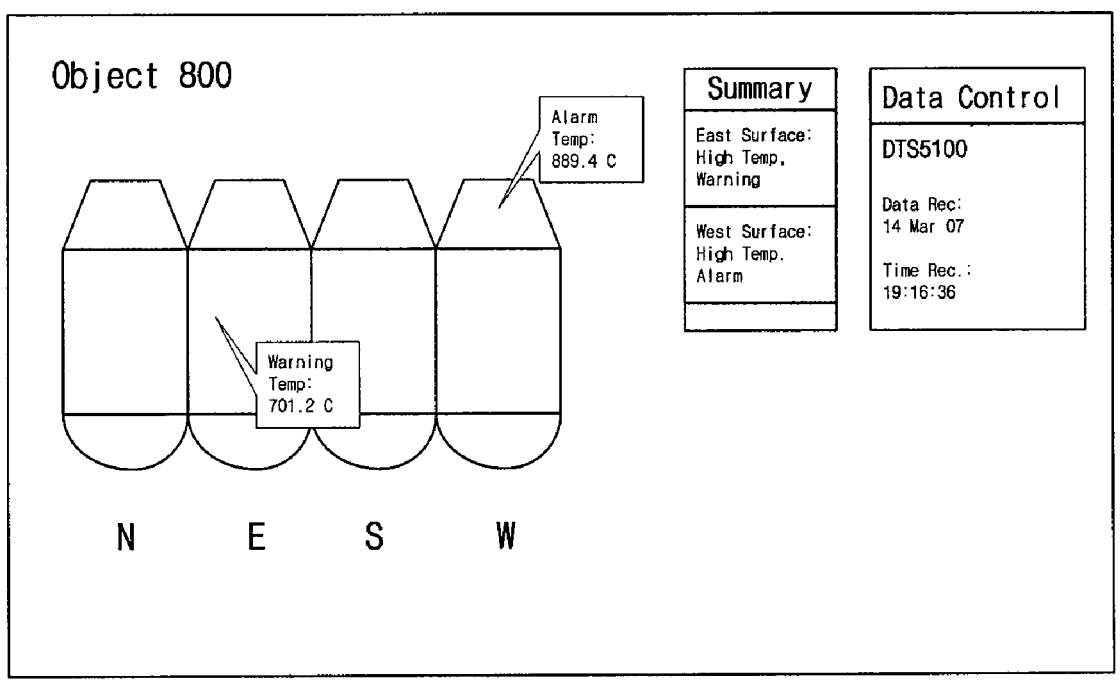
FIG. 9 illustrates a graphical user interface, in accordance with embodiments of the present disclosure.

FIG. 7 illustrates an example of a tensioner which may be used to secure sensor segments 217, 317, and 417 to portions 101, 103, and 105 of object 100, respectively, in accordance with embodiments of the disclosure. The term "tensioner," as used in this disclosure, refers to a device, a group, collection, kit, or combination of one or more components, configured to apply a tension force to or between one or more components coupled to the tensioner.

Tensioner 700 may include one or more spring members 722, which may apply the tension force on an optical fiber 706. Tensioner 700 may also include an anchor member 724. Anchor member 724 may include a plate, flange, hook, or the like and may be used to anchor optical fiber 706 to the tensioner. Anchor member 724 may be a round plate configured to conform to the radius of a bend in a sensor segment. Although the depicted embodiment includes a round plate, other anchor members 724 of various configurations may be used with tensioner 700.

Spring member 722 may improve the performance of an optical fiber to an object by increasing thermal coupling between the optical fiber and the object. For example, the tension force applied by the tensioner 700 may bring the sensor segment in closer proximity and greater contact with the object. In one embodiment, tensioner 700 may apply a tension force to the sensor segment and may cause the sensor segment to 'hug', or apply some force normal to the surface. In such an example, the sensor segment may come into closer physical contact with the object, thereby increasing thermal coupling between the object and the sensor segment.

In some embodiments, tensioner 700 may include a wire, cord, or the like configured to lace between one or more bends in optical fiber 706. The lacing may be drawn together by applying a "corset-like" force to the ends of the wire or cord. The wire or cord may be fastened together, thereby retaining the tension force produced by drawing the lacings together. In another alternative embodiment, the tensioner 700 may include one or more straps configured to run perpendicular to the orientation of optical fiber 706. In such an embodiment, one or more bolts or spring loaded bolts may fasten the bends in optical fiber 706 to the strap or plate and tightened to produce a tension force.

Figure 8:
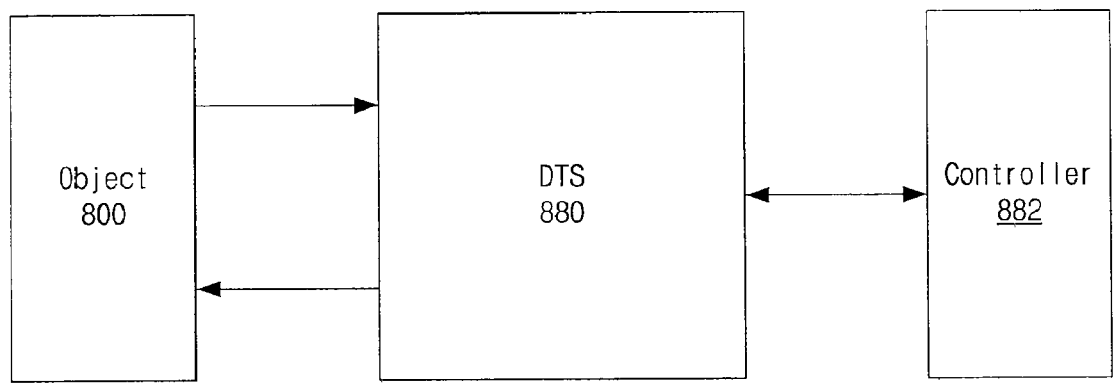
FIG. 8 illustrating a system for sensing a temperature of a surface of an object, in accordance with embodiments of the present disclosure.

FIG. 8 illustrates a system for detecting temperature(s) on the surface an object. The system may include an object 800 comprising one or more sensor segments (e.g., 217, 317, and/or 417), a distributed temperature sensing (DTS) 880 unit coupled to the one or more sensor segment, and a controller 882 coupled to the DTS unit. For example the DTS unit may be a DTS5100 from SensorTran (Austin, Tex.).

Object 800 may include one or more sensor segments in direct contact with the surface of object 800. The one or more sensor segments may comprise of optical fibers configured to transmit an optical pulse provided by DTS unit 880 and in particular an electromagnetic radiation source coupled to DTS unit 880. The optical pulse may be transmitted through the optical fiber contacting the surface of object 800. DTS unit 880 may detect the transmitted light and any backscattered or reflected lights from the optical fibers of the sensor segments in contact with the external surface of object 800.

DTS unit 880 may provide the detected transmitted and backscattered lights to controller 882, which may compare and analyze the detected light and may determine certain parameters of object 800 including, for example, the temperatures across the surface of object 800. For example, referring to FIG. 9, a graphical user interface (GUI) may display on an output display of the controller. GUI 900 may show object 800 in a Mercator-type projection where one or more surfaces of object 800 are shown side by side. In the example GUI, the surfaces rendered are taken based on the location of object 800 (e.g., North (N), East (E), South (S), and (W)). Any alarms or warnings with respect to an area on the surface may be summarized for a user.

By utilizing the sensor segments may be in contact with the surfaces of object 100, the data received may be more accurate than the techniques known in the art. Further, the variance of temperature across the surface of an object may cause a swelling in the surface of the object. The sensor segments of the present disclosure provide tensioners coupled to that sensor segments, which may provide a tension force on the sensor segments such that the sensor segments are in contact with the surface of object 100 while allowing the object and hence, the sensor segments to expand due to the pressure or temperature changes.

All of the methods disclosed and claimed herein can be executed without undue experimentation in light of the present disclosure. While the methods of this disclosure may have been described in terms of preferred embodiments, it will be apparent to those of ordinary skill in the art that variations may be applied to the methods and in the steps or in the sequence of steps of the method described herein without departing from the concept, spirit and scope of the disclosure. All such similar substitutes and modifications apparent to those skilled in the art are deemed to be within the spirit, scope, and concept of the disclosure as defined by the appended claims.

The invention claimed is:

1. A distributed temperature sensing (DTS) sensing system for measuring the surface temperature of a object made up of a combination of complex geometrical surface portions comprising:
   a. one or more sensor segments in contact with the exterior surfaces of said complex geometrical surface portions; said sensor segments comprising a plurality of optical fibers;
   b. mounting rings coupled to the surface of said object at the interface between each complex geometrical surface portion;
   c. straps connected between each sequential mounting ring coupled to the surface of said object and connected to said sensor segments to provide support to said sensor segments and to maintain contact between said sensor segments and exterior surfaces of said complex geometrical surface portions;
   d. tensioners coupled to said one or more sensor segments, wherein the tension force applied by the tensioners increase thermal coupling between said sensor segments and said exterior surfaces of said complex geometrical surface portions;
   wherein said plurality of sensors segments is coupled to a distributed temperature sensing (DTS) unit configured to quantify a temperature of the object detected by the plurality of sensor segments by measurement of transmitted and backscattered light from the optical fibers of the sensor segments in contact with the exterior surfaces of said complex geometrical surface portions.

2. The distributed temperature sensing (DTS) sensing system of claim 1, wherein each of the sensor segments comprises a coupler configured to couple one of the plurality of sensor segments to at least another sensor segment.

3. The distributed temperature sensing (DTS) sensing system of claim 1, wherein the tensioner comprises a spring member configured to supply a tension force.

4. The distributed temperature sensing (DTS) sensing system of claim 1, wherein the tensioner further comprises an anchor member configured to anchor the spring member to the at least one optical fiber.

5. The distributed temperature sensing (DTS) sensing system of claim 1, wherein the at least one or more sensor segments in contact with the exterior surfaces of said complex geometrical surface portions is configured in a wedge shape, a trapezoid shape, a rectangular shape, a square shape, or a semispherical shape.

* * * * *